US006623399B2

(12) United States Patent
Fey et al.

(10) Patent No.: US 6,623,399 B2
(45) Date of Patent: Sep. 23, 2003

(54) TRACTION FLUIDS

(75) Inventors: Kenneth Christopher Fey, Midland, MI (US); Glenn Frederick Viaplana Gordon, Midland, MI (US); Terrence Keith Hilty, Midland, MI (US); Russell Keith King, Midland, MI (US); Tina Marie Leaym, Saginaw, MI (US); Lori Ann Stark-Kasley, Midland, MI (US); Gary Michael Wieber, Midland, MI (US); Eugene Dale Groenhof, Freeland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 10/036,023

(22) Filed: Dec. 28, 2001

(65) Prior Publication Data

US 2003/0134710 A1 Jul. 17, 2003

(51) Int. Cl.$^7$ .............................................. F16H 15/00
(52) U.S. Cl. ..................... 476/7; 252/78.3; 192/21.5; 508/208; 475/125; 475/87; 475/159; 476/11; 476/8; 528/10
(58) Field of Search .................. 528/10; 252/78.3; 192/21.5; 508/208; 475/125, 87, 159; 476/11, 7, 8

(56) References Cited

U.S. PATENT DOCUMENTS

| | | | |
|---|---|---|---|
| 2,995,590 A | 8/1961 | Peeler et al. | 260/448.8 |
| 3,291,742 A | 12/1966 | Milward | 252/78 |
| 4,141,851 A | 2/1979 | Askew et al. | 252/78.3 |
| 4,190,546 A | 2/1980 | Kulik et al. | 252/49.6 |
| 4,449,415 A | 5/1984 | Groenhof | 74/214 |
| 4,577,523 A | 3/1986 | Groenhof | 74/200 |
| 4,840,743 A | 6/1989 | Gardiner | 252/49.6 |
| 5,109,095 A | 4/1992 | Butler | 528/15 |
| 5,583,095 A | 12/1996 | Kobayashi et al. | 508/207 |
| 5,629,273 A | 5/1997 | Hauenstein | 508/208 |
| 6,269,924 B1 * | 8/2001 | Sugimoto et al. | |

FOREIGN PATENT DOCUMENTS

| | | | |
|---|---|---|---|
| EP | 0102088 | 3/1984 | C10M/3/44 |
| EP | 0240814 A2 | 10/1987 | C10M/111/00 |
| EP | 0350125 A1 | 1/1990 | C10M/105/76 |
| EP | 0389138 | 9/1990 | C08G/77/06 |
| JP | 93247481 | 9/1993 | |
| JP | 93255681 | 10/1993 | |
| JP | 94271588 | 9/1994 | |
| JP | 01234185 A | 8/2001 | |
| JP | 2001342477 | 12/2001 | |
| WO | WO 91/13133 | 9/1991 | C10M/135/00 |

OTHER PUBLICATIONS

Journal of Chemical and Engineering Data, "Extending the Utility of Silicone Lubricants through Structural Modifications", H.M. Schiefer, R.W. Awe, and C.L. Whipple, vol. 6, No. 1, Jan. 1961, p. 155–160.

"The formation of silicone polymer films on metal surfaces at high temperatures and their boundary lubricating properties", D. Tabor & R.F. Willis, Wear. 13 (1969) 413–442.

"The formation of polysiloxane films on metal surfaces and their lubricating properties" R.F. Willis, Department of Surface Physics, Cavendish Laboratory, Cambridge.

Nature, "Thermal Decomposition of Silicone Fluids at Metal surfaces", vol 221, Mar. 22, 1969. p. 1134–1135.

"The Real Costs of Lubrication", Dr. Roger Melley and Peter Wissner, P.Eng., Presented at the 99th AGM–CIM Technical Program–M/E Division Apr. 1997, p. 1–26.

"Thin film lubrication with substituted silicones: The role of physical and chemical factors", Tabor and Willis, Surface Physics, Cavendish laboratory, Cambridge (Gt. Britain) Wear, II (1968), p. 145–162.

"The effects of Oxygen availability on the lubricating performance of a dimethyl silicone in the boundary regime", A.R. Lansdown, Wear, 175 (1994) p. 25–38.

Journal of Colloid and Interface Science, "The Thermal Oxidative Decomposition of Polyorganosioxane Fluids at Metal Surfaces", Willis and Shaw, vol 31, No. 3, Nov. 1969, p. 397–408.

"Effect of temperature on lubricity of lubricating silicones", Wear, 15 (1970) 131–135, E.D. Brown, Jr.

"Silicone Fluids: Their Action as Boundary Lubricants", D. Tabor and W.O. Winear. Asle Transactions 8, 69–77 (1965).

Lubrication Science 10–3, May 1998, "Antiwear and Extreme–Pressure Additives in Lubricants, A.G. Papay Polymer, vol. 38, No. 20, 1997, pp. 5203–5209"."Function and performance of silicone copolymers: 1. Syntheses of polysiloxane–containing copolymers and their absorption phenomena under extreme pressure", Ping–Lin Kuo, Kuo–Cheng Chen, and Tzong–Liu Wang.

"The Nature of Wear Debris Generated During Lubricated Wear–In", Asle Transactions vol. 26, 4, 517–522, W.A. Glaeser.

* cited by examiner

Primary Examiner—Robert Dawson
Assistant Examiner—Kuo-Liang Peng
(74) Attorney, Agent, or Firm—Patricia M. Scaduto

(57) ABSTRACT

Siloxane compositions are useful as traction fluids in traction drive systems which are subject to varied operating temperature and pressure conditions. Specific siloxane compositions included contain units of formulae (I) $(R_3SiO_{1/2})(RSiO_{3/2})(SiO_{4/2})$,
(II) $(R_3SiO_{1/2})(RSiO_{3/2})$,
(III) $(R_3SiO_{1/2})(SiO_{4/2})$,
(IV) $(R_3SiO_{1/2})(R_2SiO_{2/2})(RSiO_{3/2})$,
(V) $(R_3SiO_{1/2})(R_2SiO_{2/2})$, and
(VI) $(R_2SiO_{2/2})_a$ in varying mole percents, where a is an integer ranging from 3 to 20 and each R is independently selected from alkyl groups comprising 1 to 18 carbon atoms and aryl groups comprising 6 to 18 carbon atoms.

23 Claims, No Drawings

TRACTION FLUIDS

FIELD OF THE INVENTION

The invention relates to siloxane compositions which are useful as traction fluids in traction drive systems subject to varied operating temperature and pressure conditions.

BACKGROUND OF THE INVENTION

Certain hydrocarbon oils and organosilicone compounds have been found to be useful in a variety of engineering applications, including traction fluids for traction drive systems. Most current toroidal—continuously variable transmission (T-CVT) traction fluids are hydrocarbon molecules based primarily on dimers of the same or two different monomers. They possess saturated rings structures such as cyclohexane, alkylcyclohexane, bicycloheptane or bicyclooctane. Traction is broadly defined as the adhesive friction of a body on a surface on which it moves. A traction drive is a device in which torque is transmitted from an input element to an output element through nominal point or line contact typically with a rolling action by virtue of the traction between the contacting elements.

While traction elements are commonly spoken of as being in contact, it is generally accepted that a fluid film is present therebetween. Almost all traction drives require these fluids to remove heat, to prevent wear at the contact surfaces and to lubricate bearings and other moving parts associated with the drive. Thus, instead of metal to metal rolling contact there is a film of fluid introduced into the contact zone and interposed between the metal elements. High pressures and high shear conditions are found in this area of contact between the roller elements and so the nature of this fluid determines to a large extent the limits of performance and the capacity of the drive. It is through the traction fluid's resistance to shear that the torque transmitting ability of a given fluid arises. The torque transmitting ability of a fluid, and thus its suitability as a traction fluid, is measured by and is directly related to its traction coefficient at varying temperatures. In addition to a fluid's torque transmitting ability, its ability to protect against wear is also important.

The inventors have now determined that certain siloxane compositions have traction coefficients and anti-wear properties that make them useful as traction fluids at varied temperatures. An object of the invention is to provide traction fluids useful for low temperature applications. Another object of the invention is to provide traction fluids useful for high temperature applications. Another object of the invention is to provide traction fluids having improved anti-wear properties.

SUMMARY OF THE INVENTION

This invention relates to siloxane compositions which are useful as traction fluids in traction drive systems which are subject to varied operating temperature conditions. Specific siloxane compositions included contain units of formulae (I) $(R_3SiO_{1/2})(RSiO_{3/2})(SiO_{4/2})$, (II) $(R_3SiO_{1/2})(RSiO_{3/2})$, (III) $(R_3SiO_{1/2})(SiO_{4/2})$, (IV) $(R_3SiO_{1/2})(R_2SiO_{2/2})(RSiO_{3/2})$, (V) $(R_3SiO_{1/2})(R_2SiO_{2/2})$, and (VI) $(R_2SiO_{2/2})_a$ in varying mole percents, where a is an integer ranging from 3 to 20 and each R is independently selected from alkyl groups comprising 1 to 18 carbon atoms and aryl groups comprising 6 to 18 carbon atoms.

DETAILED DESCRIPTION OF THE INVENTION

A method for transmitting torque in a traction drive system having at least two relatively rotatable members in a torque transmitting relationship comprising disposing on the tractive surfaces of the members a traction fluid comprising at least one siloxane composition chosen from (I) 33 to 80 mole percent units of formula $(R_3SiO_{1/2})$, 0.2 to 66.8 mole percent units of formula $(RSiO_{3/2})$, and 66.8 to 0.2 mole percent units of formula $(SiO_{4/2})$ having a viscosity of from 1.0 to 50,000 mPa·s at 40° C., where each R is independently selected from alkyl groups comprising 1 to 18 carbon atoms and aryl groups comprising 6 to 18 carbon atoms provided from 10 to 70 mole percent of R groups are not methyl;

(II) 33 to 75 mole percent units of formula $(R_3SiO_{1/2})$ and 67 to 25 mole percent units of formula $(RSiO_{3/2})$ having a viscosity of from 2.0 to 20,000 mPa·s at 40° C., where each R is independently selected from alkyl groups comprising 1 to 18 carbon atoms and aryl groups comprising 6 to 18 carbon atoms provided from 10 to 70 mole percent of R groups are not methyl;

(III) 33 to 80 mole percent units of formula $(R_3SiO_{1/2})$ and 67 to 20 mole percent units of formula $(SiO_{4/2})$ having a viscosity of from 1.0 to 70,000 mPa·s at 40° C., where each R is independently selected from alkyl groups comprising 1 to 18 carbon atoms and aryl groups comprising 6 to 18 carbon atoms provided from 10 to 70 mole percent of R groups are not methyl;

(IV) 0 to 28 mole percent units of formula $(R_3SiO_{1/2})$, 37 to 93 mole percent units of formula $(R_2SiO_{2/2})$, and 6 to 56 mole percent units of formula $(RSiO_{3/2})$ having a viscosity of from 5.0 to 10,000 mPa·s at 40° C., where each R is independently selected from alkyl groups comprising 1 to 18 carbon atoms and aryl groups comprising 6 to 18 carbon atoms provided from 10 to 70 mole percent of R groups are not methyl and provided further that at least one of the R groups which is not methyl is chosen from alkyl groups comprising 7 to 18 carbon atoms and aryl groups comprising 7 to 18 carbon atoms;

(V) 1 to 100 mole percent units of formula $(R_3SiO_{1/2})$ and 99 to 0 mole percent units of formula $(R_2SiO_{2/2})$ having a viscosity of from 1.0 to 50,000 mPa·s at 40° C., where each R is independently selected from alkyl groups comprising 1 to 18 carbon atoms and aryl groups comprising 6 to 18 carbon atoms provided from 10 to 70 mole percent of R groups are not methyl and provided further that at least one of the R groups which is not methyl is chosen from alkyl groups comprising 7 to 18 carbon atoms and aryl groups comprising 7 to 18 carbon atoms; and (VI) cyclosiloxanes of formula $(R_2SiO_{2/2})_a$ having a viscosity of from 2.0 to 50,000 mPa·s at 40° C., where a is an integer ranging from 3 to 20, each R is independently selected from alkyl groups comprising 1 to 18 carbon atoms and aryl groups comprising 6 to 18 carbon atoms provided from 10 to 70 mole percent of R groups are not methyl.

The traction fluids useful in the present method comprise at least one siloxane composition chosen from (I)–(VI) described above, preferably chosen from (II), (III), (IV), (V), and (VI), and more preferably chosen from (II), (III), and (VI). The siloxane compositions described above may contain monofunctional siloxane units (M units) represented by formula ($R_3SiO_{1/2}$), difunctional siloxane units (D units) represented by formula ($R_2SiO_{2/2}$), trifunctional siloxane units (T units) represented by formula ($RSiO_{3/2}$), and tetrafunctional siloxane units (Q units) represented by formula ($SiO_{4/2}$).

Each R in siloxane compositions (I)–(VI) is independently selected from alkyl groups comprising 1 to 18 carbon atoms and aryl groups comprising 6 to 18 carbon atoms. The alkyl groups of R can be linear, branched and cyclic. Examples of linear alkyl groups include methyl, ethyl, propyl, butyl, pentyl, hexyl, heptyl, octyl, decyl, and octadecyl. Examples of branched alkyl groups include isobutyl, tertiary butyl, 2-ethylhexyl, 2,4,4,6,6-pentarnethylheptyl and 2,4,4-trimethylpentyl. The cyclic groups may be attached directly to the silicon atom or attached through a divalent hydrocarbon group. Preferably, the divalent hydrocarbon group is an alkylene group. In addition, the cyclic groups may have hydrocarbon groups attached to the ring. Examples of cyclic alkyl groups include cyclobutyl, cyclopentyl, cyclohexyl, methylcyclohexyl, dimethylcyclohexyl, 2-cyclohexylethyl, 2-cyclohexylpropyl, cyclooctyl, bicyclo (2.2.1) heptyl, bicyclo (2.2.2) octyl, methylnorbornyl, ethylnorbornyl, trimethylnorbornyl, 2-norbornylethyl, and decanyl.

The aryl groups of R may be attached directly to the silicon atom or attached through a divalent hydrocarbon group. Preferably, the divalent hydrocarbon group is an alkylene group. In addition, the aryl groups may have hydrocarbon groups attached to the aromatic ring. Examples of the aryl radicals comprising 6 to 18 carbon atoms include phenyl, benzyl, tolyl, xylyl, 2-phenyl-2-methylethyl, naphthyl, methylnaphthyl, ethylnaphthyl, 2-naphthylethyl, and 2-phenylethyl.

Preferably, each R is independently selected from linear alkyl groups comprising 1 to 8 carbon atoms, branched alkyl groups comprising 4 to 18 carbon atoms, and cyclic alkyl groups comprising 5 to 18 carbon atoms. Alternatively, each R may also be independently selected from methyl, cyclohexyl, 2,4,4-trimethylpentyl, and norbornyl.

Siloxane composition (I) contains 33 to 80 mole percent siloxane units of formula ($R_3SiO_{1/2}$) (M units), 0.2 to 66.8 mole percent siloxane units of formula ($RSiO_{3/2}$) (T units), and 66.8 to 0.2 mole percent siloxane units of formula ($SiO_{4/2}$) (Q units) having a viscosity of from 1.0 to 50,000 mPa·s at 40° C., where each R is independently selected from alkyl groups comprising 1 to 18 carbon atoms and aryl groups comprising 6 to 18 carbon atoms provided from 10 to 70 mole percent of R groups are not methyl. Examples of R are as described above. Although siloxane composition (I) generally contains M units, T units, and Q units in each molecule, so long as it doesn't affect the object of the invention, siloxane composition (I) may also contain difunctional siloxane units (D units) represented by formula ($R_2SiO_{2/2}$).

Siloxane composition (II) contains 33 to 75 mole percent siloxane units of formula ($R_3SiO_{1/2}$) (M units) and 67 to 25 mole percent siloxane units of formula ($RSiO_{3/2}$) (T units) having a viscosity of from 2.0 to 20,000 mPa·s at 40° C., where each R is independently selected from alkyl groups comprising 1 to 18 carbon atoms and aryl groups comprising 6 to 18 carbon atoms provided from 10 to 70 mole percent of R groups are not methyl.

Preferably, siloxane composition (II) contains 33 to 67 mole percent M units and 67 to 33 mole percent T units having a viscosity of from 5.0 to 20,000 mPa·s at 40° C., where each R is independently selected from linear alkyl groups comprising 1 to 8 carbon atoms, branched alkyl groups comprising 4 to 18 carbon atoms, and cyclic alkyl groups comprising 5 to 18 carbon atoms provided from 15 to 60 mole percent of R groups are not methyl.

More preferably, siloxane composition (11) contains 50 to 67 mole percent M units and 50 to 33 mole percent T units having a viscosity of from 5.0 to 5,000 mPa·s at 40° C., where each R is independently selected from methyl, cyclohexyl, 2,4,4-trimethylpentyl, and norbornyl provided from 18 to 57 mole percent of R groups are not methyl.

Siloxane composition (III) contains 33 to 80 mole percent units of formula ($R_3SiO_{1/2}$) (M units) and 67 to 20 mole percent units of formula ($SiO_{4/2}$) (Q units) having a viscosity of from 1.0 to 70,000 mPa·s at 40° C., where each R is independently selected from alkyl groups comprising 1 to 18 carbon atoms and aryl groups comprising 6 to 18 carbon atoms provided from 10 to 70 mole percent of R groups are not methyl. Although siloxane composition (III) generally contains M and Q units in each molecule, so long as it doesn't affect the object of the invention, siloxane composition (III) may also contain difunctional siloxane units (D units) represented by formula ($R_2SiO_{2/2}$).

Preferably, siloxane composition (III) contains 50 to 75 mole percent M units and 50 to 25 mole percent Q units having a viscosity of from 5.0 to 50,000 mPa·s at 40° C., where each R is independently selected from linear alkyl groups comprising 1 to 8 carbon atoms, branched alkyl groups comprising 4 to 18 carbon atoms, and cyclic alkyl groups comprising 5 to 18 carbon atoms provided from 10 to 67 mole percent of R groups are not methyl.

More preferably, siloxane composition (III) contains 67.0 to 71.4 mole percent M units and 33.0 to 28.6 mole percent Q units having a viscosity of from 10.0 to 5,000 mPa·s at 40° C., where each R is independently selected from methyl, cyclohexyl, 2,4,4-trimethylpentyl, and norbornyl provided from 24 to 67 mole percent of R groups are not methyl.

Siloxane composition (IV) contains 0 to 28 mole percent units of formula ($R_3SiO_{1/2}$) (M units), 37 to 93 mole percent units of formula ($R_2SiO_{2/2}$) (D units), and 6 to 56 mole percent units of formula ($RSiO_{3/2}$) (T units) having a viscosity of from 5.0 to 10,000 mPa·s at 40° C., where each R is independently selected from alkyl groups comprising 1 to 18 carbon atoms and aryl groups comprising 6 to 18 carbon atoms provided from 10 to 70 mole percent of R groups are not methyl and provided further that at least one of the R groups which is not methyl is chosen from alkyl groups comprising 7 to 18 carbon atoms and aryl groups comprising 7 to 18 carbon atoms.

Preferably, siloxane composition (IV) contains 0.1 to 10 mole percent M units, 40 to 55 mole percent D units and 40 to 55 mole percent T units having a viscosity of from 200 to 5,000 mPa·s at 40° C., where each R is independently selected from linear alkyl groups comprising 1 to 8 carbon atoms, branched alkyl groups comprising 4 to 18 carbon atoms, and cyclic alkyl groups comprising 5 to 18 carbon atoms provided from 10 to 50 mole percent of R groups are not methyl and provided further that at least one of the R groups which is not methyl is chosen from alkyl groups comprising 7 to 18 carbon atoms.

Siloxane composition (V) contains 1 to 100 mole percent units of formula ($R_3SiO_{1/2}$) (M units) and 99 to 0 mole percent units of formula ($R_2SiO_{2/2}$) (D units) having a viscosity of from 1.0 to 50,000 mPa·s at 40° C., where each R is independently selected from alkyl groups comprising 1 to 18 carbon atoms and aryl groups comprising 6 to 18 carbon atoms provided from 10 to 70 mole percent of R groups are not methyl and provided further that at least one of the R groups which is not methyl is chosen from alkyl groups comprising 7 to 18 carbon atoms and aryl groups comprising 7 to 18 carbon atoms.

Preferably, siloxane composition (V) contains 2.0 to 100 mole percent M units and 98 to 0 mole percent D units having a viscosity of from 2.0 to 30,000 mPa·s at 40° C., where each R is independently selected from linear alkyl groups comprising 1 to 8 carbon atoms, branched alkyl groups comprising 4 to 18 carbon atoms, and cyclic alkyl groups comprising 5 to 18 carbon atoms provided from 10 to 60 mole percent of R groups are not methyl and provided further that at least one of the R groups which is not methyl is chosen from alkyl groups comprising 7 to 18 carbon atoms.

More preferably, siloxane composition (V) contains 5.0 to 100 mole percent M units and 95 to 0 mole percent D units having a viscosity of from 3.0 to 5,000 mPa·s at 40° C., where each R is independently selected from linear alkyl groups comprising 1 to 8 carbon atoms, branched alkyl groups comprising 4 to 18 carbon atoms, and cyclic alkyl groups comprising 5 to 18 carbon atoms provided from 10 to 50 mole percent of R groups are not methyl and provided further that at least one of the R groups which is not methyl is chosen from alkyl groups comprising 7 to 18 carbon atoms.

Siloxane composition (VI) contains cyclosiloxanes of formula $(R_2SiO_{2/2})_a$ ($D_a$ units) having a viscosity of from 2.0 to 50,000 mPa·s at 40° C., where a is an integer ranging from 3 to 20, each R is independently selected from alkyl groups comprising 1 to 18 carbon atoms and aryl groups comprising 6 to 18 carbon atoms provided from 10 to 70 mole percent of R groups are not methyl.

Preferably, siloxane composition (VI) contains cyclosiloxanes of formula $(R_2SiO_{2/2})_a$ having a viscosity of from 5.0 to 50,000 mPa·s at 40° C., where a is an integer ranging from 4 to 10, each R is independently selected from linear alkyl groups comprising 1 to 8 carbon atoms, branched alkyl groups comprising 4 to 18 carbon atoms, and cyclic alkyl groups comprising 5 to 18 carbon atoms provided from 10 to 50 mole percent of R groups are not methyl.

More preferably, siloxane composition (VI) contains cyclosiloxanes of formula $(R_2SiO_{2/2})_a$ having a viscosity of from 5.0 to 50,000 mPa·s at 40° C., where a is an integer ranging from 4 to 10 and each R is independently selected from methyl, cyclohexyl, 2,4,4-trimethylpentyl, and norbornyl provided from 10 to 50 mole percent of R groups are not methyl.

The siloxane compositions useful in this invention may be prepared by methods well known in the art. The specific units in siloxane fluids (I)–(V) are basic silicon containing intermediates. The copolymerization of these units is generally accomplished by hydrolysis and subsequently the condensation of either chlorosilanes or alkoxysilanes. For example, siloxane fluids (I)–(V) may be prepared by the hydrolysis and condensation of appropriate amounts of $RSiCl_3$, $R_2SiCl_2$, $R_3SiCl$, and $SiCl_4$ where R is as described above. A review of this process can be found in "The Chemistry and Technology of Silicones," pp. 192–198, by W. Noll (1968). When using chlorosilanes as a starting material HCl is generated as a by-product and must be neutralized or otherwise removed. One can neutralize HCl using an aqueous solution of base, such as a bicarbonate or carbonate salt of a metal such as sodium or potassium or calcium, or by repeated washing with water. Both methods may also be employed together. When made from alkoxysilanes, residual alcohol can be distilled overhead.

Those skilled in the art will recognize that catalysts such as minerals, acids, and bases can be used to facilitate the hydrolysis/condensation process. A neutral solvent such as toluene may also be used to facilitate the reaction. A solvent may also be used when various reactive capping agents are used to reduce residual silanols in the siloxane fluid. The solvent may then be removed by known methods such as distillation after the siloxane fluid's manufacture is complete.

R groups other than methyl can be added to the M, D, and T units either before the hydrolysis/condensation process or after. In either case, two principle routes are available to put these groups on the silicon. One involves the use of the corresponding chlorosilane and subjecting it to a Grignard process (Noll, pp 42–46). This is especially effective for adding aromatic groups to silicon, and has been industrially practiced for over 50 years. If it is preferred to eliminate the unsaturation from the molecule, hydrogenation of the aromatic group can be carried out as a second step. A variety of hydrogenation catalysts, such as nickel or platinum complexes, can be used to carry out the reaction.

The second process path is to add an olefin to a hydrogen function silicone material using a platinum catalyst system (Noll, pp. 50–55). Such a reaction can be carried out on the starting monomeric M, D, or T unit; or it can be carried out on a polymer or copolymer intermediate that has the correct amount of silicon hydride functionality in its structure.

Depending on the olefin employed, a subsequent reaction, preferably using a $C_2$–$C_4$ olefin to remove residual Si—H, may be required. The advantage of this process path is that solvent use can be minimized, or in some cases eliminated, and the amount of residual by-products is greatly reduced. If more than one olefin is used simultaneously, one must consider whether the hydrosilation rate for each olefin is competitive with the other. If their hydrosilation rates are competitive, then a randomly functionalized copolymer will be obtained. If the olefins' hydrosilation rates differ, however, then a block type of copolymer can result unless the olefins are added sequentially so as to insure the even distribution of both olefins on to the SiH containing siloxane substrate.

Siloxane composition (VI) contains cyclosiloxanes and may be prepared by methods well known in the art.

Preferably, each of the siloxane compositions (I)–(VI) will be essentially fully condensed, however, depending on the method of manufacture, up to 20 mole percent silanol can be present in siloxane fluids (I)–(IV).

Depending on the range of temperatures required for a particular traction drive system, siloxane compositions (I)–(VI) may each be employed alone as traction fluids or may be blended to form a traction fluid. Other materials can also be added along with the siloxane compositions of this invention including hydrocarbon fluids such as cyclohexane, alkylcyclohexane, bicycloheptane, bicyclooctane, unsaturated and hydrogenated polyisobutylene, and saturated naphthenic oils, and other organosilicone fluids such as described in JP 6-271588, EP 0350125, U.S. Pat. Nos. 4,449,415 and 4,577,523. In addition, additives such as anti-wear agents, anti-oxidation agents, anti-rust agents, anti-foam agents, etc may be added as necessary. Such additives are well known in the art.

In a preferred embodiment of the invention, anti-wear properties of the traction fluid are also improved therefore reducing or eliminating the need for additional anti-wear additives. A method of reducing wear in a traction drive system having at least two relatively rotatable members in a torque transmitting relationship comprising disposing on the tractive surfaces of the members a traction fluid comprising at least one siloxane composition chosen from (IVa) 0 to 28 mole percent units of formula $(R_3SiO_{1/2})$, 37 to 93 mole percent units of formula $(RCH_3SiO_{2/2})$, and 6 to 56 mole percent units of formula $(RSiO_{3/2})$ having a viscosity of from 5.0 to 10,000 mPa·s at 40° C., where each R is independently selected from alkyl groups comprising 1 to 18 carbon atoms and aryl groups comprising 6 to 18 carbon atoms provided (a) at least 65 mole percent of the R groups on $(RCH_3SiO_{2/2})$ are independently selected from alkyl groups comprising 5 to 18 carbon atoms, (b) no more than 35 mole percent of the R groups on $(RCH_3SiO_{2/2})$ are independently selected from aryl groups comprising 6 to 18 carbon atoms, and (c) at least one of all R groups which is not methyl is chosen from alkyl groups comprising 7 to 18 carbon atoms and aryl groups comprising 7 to 18 carbon atoms;

(Va) 4 to 33 mole percent units of formula $(R_3SiO_{1/2})$ and 96 to 67 mole percent units of formula $(RCH_3SiO_{2/2})$ having a viscosity of from 1.0 to 50,000 mPa·s at 40° C., where each R is independently selected from alkyl groups comprising 1 to 18 carbon atoms and aryl groups comprising 6 to 18 carbon atoms provided (a) at least 65 mole percent of the R groups on $(RCH_3SiO_{2/2})$ are independently selected from alkyl groups comprising 5 to 18 carbon atoms, (b) no more than 35 mole percent of the R groups on $(RCH_3SiO_{2/2})$ are independently selected from aryl groups comprising 6 to 18 carbon atoms, and (c) at least one of all R groups which is not methyl is chosen from alkyl groups comprising 7 to 18 carbon atoms and aryl groups comprising 7 to 18 carbon atoms; and (VIa) cyclosiloxanes of formula $(RMeSiO_{2/2})_a$ having a viscosity of from 2.0 to 50,000 mPa·s at 40° C., where a is an integer ranging from 3 to 20, each R is independently selected from alkyl groups comprising 1 to 18 carbon atoms and aryl groups comprising 6 to 18 carbon atoms provided (a) at least 80 mole percent of the R groups on $(RMeSiO_{2/2})$ are independently selected from alkyl groups comprising 5 to 18 carbon atoms, and (b) no more than 20 mole percent of the R groups on $(RMeSiO_{2/2})$ are independently selected from aryl groups comprising 6 to 18 carbon atoms.

Preferably, for improved anti-wear properties the traction fluid comprises at least one siloxane composition chosen from (Va) and (VIa). More preferably, the traction fluid comprises (VIa) where (a) at least 80 mole percent of the R groups on $(RMeSiO_{2/2})$ are independently selected from branched alkyl groups comprising 5 to 18 carbon atoms, and cyclic alkyl groups comprising 5 to 18 carbon atoms provided no more than 30 mole percent of the R groups on $(RMeSiO_{2/2})$ are cyclic alkyl groups.

The siloxane compositions of the present invention are useful as traction fluids in traction drive apparatus or friction drive apparatus using rolling contact subject to varied operating temperatures and pressures. Examples of where such traction drive apparatus may be used include automobiles, industrial machinery, and helicopters.

EXAMPLES

The following Examples are merely illustrative and are not intended to limit the invention. Any reference to M, D, T, and Q units describe units of the formulae $R_3SiO_{1/2}$, $R_2SiO_{2/2}$, $RSiO_{3/2}$, and $SiO_{4/2}$ respectively, where each R group is as defined.

Test Methods:

Traction Coefficients: (a) Unless otherwise described, traction was measured using a Mini Traction Machine (MTM) Test System from PCS Instruments of London, UK. A ¾" bearing steel (AISI 52100 grade steel) ball and a 46 mm bearing steel (AISI 52100) disk were used for these determinations. The test conditions were set at: 2 m/s disk speed, 1.25 GPa pressure, 2% slide roll, and temperatures from 0° C. to 140° C.. The test chamber was disassembled and cleaned with toluene, then isopropyl alcohol, between each test run. Trace solvent was removed from the test chamber with dry air. All samples were run neat except G,H,I,K which, were run as 65% wt solutions in polyisobutylene.

(b) The data in Table 2 was generated using a $WAM_{hs}$ testing machine (Wedeven Associates, Edgemont, Pa.) under conditions which varied from –40° C. to 20° C., from 2.0 to 10.0 meters per second, and from 1.5–4.0 GPa pressure at 2% Slide Roll Ratio. The test machine was equipped with a cooling unit to permit measurement of traction at temperatures as low as –40° C. The machine's disk was 102 mm diameter and 12.7 mm thick while the ball was 20.64 mm diameter. AISI 52100 steel with a hardness of 60–63 HRC was used. In each case, when the result for a traction coefficient is specified as "fluid starved", this means the high viscosity of the tested material under those specified conditions inhibits fluid flow to the extent a traction coefficient could not be obtained.

Molecular Weight: Gel permeation chromatography (GPC) methods were used to determine the average molecular weight of the samples prepared.

Method A: When using polystyrene as a reference standard, the samples were tested in a 0.5% concentration of the sample in THF using PL mixed C columns designed for 200–3,000,000 molecular weight with an RI detector.

Method B: When using silicone resin fractions as a reference standard, the samples were tested in a 0.5% concentration of the sample in $CHCl_3$ using PL gel 5 μm Mixed-D columns designed for 200–400,000 molecular weight with an infrared detector.

Method C: When using PDMS standards, the samples were tested in a 0.5% concentration of the sample in toluene using PL gel 5 μm Mixed-C columns designed for 200–2,000,000 molecular weight with an RI detector.

Viscosity: The dynamic viscosity at a frequency of 10 rad $s^{-1}$ was measured using a Rheometric Scientific RDAII rheometer equipped with 50-mm-diameter parallel-plate fixtures. The samples were tested in a temperature range of –40° C. to 120° C. using a heating rate of 2° C./min, where liquid nitrogen was used to cool the test chamber. All tests were run neat except Sample K (65% wt in polyisobutylene).

NMR: The NMR analysis was done using a Mercury 400 mHz super conducting spectrometer. The instrument uses a silicon-free probe. Characterization of these materials was done using $^{29}Si$ and $^{13}C$ experiments. Samples were prepared using a 60/40 ratio of deuterated chloroform ($CDCl_3$) to sample material. The NMR sample contained 0.02 molar Chromium (III) acetylacetonate ($Cr(acac)_3$). This compound was used as a relaxation agent to increase the efficiency of the experiments. NMR samples were prepared in Teflon tubes to eliminate the silicon signal in the Q region that occurs with glass tubes. In most cases, the acquisition time was 1–2 hours. Similar procedures for sample preparation were also used for $^{13}C$ NMR.

Anti-wear Measurements: ASTM Method D 4172 was used. In summary, three 12.7 mm (1/2") diameter steel balls are clamped together and covered with the material to be evaluated. A fourth 12.7 mm diameter steel ball, referred to as the top ball, was pressed with a force of 147 or 392 N (15 or 40 kgf) into the cavity formed by the three clamped balls for three-point contact. The temperature of the test lubricant was regulated at 100° C. (212° F.) and then the top ball was rotated at 600 RPM for 60 minutes. Materials were compared by using the average size of the scar diameters worn on the three lower clamped balls.

Preparation of Examples

Example A1

Into a 3-neck flask were combined 118.43 grams of cyclohexyldimethylchlorosilane, 49.33 grams of methyltrimethoxysilane, and 165.71 grams of dimethoxyethane (DME). With the materials being stirred, 22.42 grams of water were added over a two minute period. The temperature was raised to and then held at 50° C. for one hour. Solvent, water and methanol were then stripped from the silicone under vacuum at 100° C. The product from the stripping operation was then re-dissolved into 120 grams of fresh DME, 7.5 grams of water was added and then 44.76 grams of trimethylchlorosilane. The reaction was brought to 50° C. and held there for 1 hour. The DME and residual water were then stripped out under vacuum at 100° C. Toluene was used to re-dissolve the product, and then extracted with saturated aqueous $NaHCO_3$ and fresh water until the wash water pH was greater than 6. The toluene was then stripped away using a Rotovap® unit for 1 hour at 5 mm Hg. 92.4 grams of resin product was recovered. $^{13}C$ and $^{29}Si$ NMR analysis indicated the composition to be: $M(cyclohexyldimethyl)_{0.54}$ $M(trimethyl)_{0.08}$ $T(methyl)_{0.38}$ wherein the total M:T mole ratio is 1.63. The viscosity was measured as 1,260 mPa·s (−40° C.), 70 mPa·s (0° C.), 15 mPa·s (40° C.), and 5 mPa·s (100° C.). The molecular weight as determined from a 0.5% wt THF solution run through a gel permeation column using polystyrene as a reference standard was 400 (Mn) and 510 (Mw) grams per mole. Traction coefficients were tested at various temperatures and the results are provided in Table 1.

Example A2

Example A1 was repeated using the same process. $^{13}C$ and $^{29}Si$ NMR analysis indicated the composition to be: $M(cyclohexyldimethyl)_{0.54}$ $M(trimethyl)_{0.05}$ $T(methyl)_{0.41}$. The viscosity was measured as 2,620 mPa·s (−40° C.), 101 mPa·s (0° C.), 20 mPa·s (40° C.), and 5 mPa·s (100° C.). Traction coefficients were tested at various temperatures and the results are provided in Table 1. See Table 2 for traction testing at different speeds and pressures.

Example B

This was prepared in the same manner as Example A1. However, instead of cyclohexyldimethylchlorosilane, 100 grams of norbornyldimethylchlorosilane was mixed with 48.11 grams of methyl trimethoxysilane. $^{13}C$ and $^{29}Si$ NMR analysis indicated the composition to be: $M(trimethyl)_{0.14}$ $M(norbornyldimethyl)_{0.48}$ $T(methyl)_{0.38}$. The viscosity was measured as 3,440 mPa·s (−40° C.), 107 mPa·s (0° C.), 21 mPa·s (40° C.), and 5 mPa·s (100° C.). The molecular weight as determined from a 0.5% wt THF solution run through a gel permeation column using polystyrene as a reference standard was 380 (Mn) and 510 (Mw) grams per mole. Traction coefficients were tested at various temperatures and the results are provided in Table 1.

Example C 510 grams of water were added to a 2-L, 3-neck round bottom flask. With mixing, a solution composed of 80.31 grams of cyclohexyldimethylchlorosilane, 118.64 grams of cyclohexyltrichlorosilane and 282.9 grams of toluene was added dropwise to the water. The addition took 20 minutes and the temperature of the reaction rose to 50° C. The reaction was run an additional five hours at 80° C., then when cool the aqueous acid layer was removed. The product layer was washed repeatedly with saturated aqueous $NaHCO_3$ and water until the water wash had a pH of 6 or greater. Enough toluene was then stripped out to yield a 40% wt solids resin solution. After titrating the product layer to determine the amount of residual HCl still present, 3% wt aqueous KOH was added so that the final concentration of KOH was 1000 ppm. The reaction was then heated to 100–110° C. and a Dean Stark Trap was used to remove water. After collecting 8.57 grams of water from the trap, the reaction was cooled and then 9.1 ml of trimethylchlorosilane was added to neutralize any residual KOH. The product solution was then washed with aqueous $NaHCO_3$ and water until pH was greater than 6. The product solution was dried over $MgSO_4$, filtered, and the toluene stripped off using a Rotovap® unit. $^{13}C$ and $^{29}Si$ NMR analysis indicated the composition to be: $M(cyclohexyldimethyl)_{0.46}$ $T(cyclohexyl)_{0.54}$. The viscosity was measured as 56,000,000 mPa·s (−40° C.), 102,000 mPa·s (0° C.), 858 mPa·s (40° C.), and 61 mPa·s (100° C.). The molecular weight as determined from a 0.5% wt THF solution run through a gel permeation column using polystyrene as a reference standard was 490 (Mn) and 640 (Mw) grams per mole. Traction coefficients were tested at various temperatures and the results are provided in Table 1.

Example D

Using the same process as Example C, 382.9 grams of water was added to a 2 liter, 3 neck glass flask. Added dropwise were 60.25 grams of cyclohexyldimethylchlorosilane, 93.88 grams of norbornyltrichlorosilane and 221.98 grams of toluene to produce a silicone hydrolysate in toluene. After separating the aqueous acid layer and washing the toluene product layer with water and aqueous $NaHCO_3$ until the pH was 6.5, the product layer was stripped to remove toluene 40% silicone solids. After titrating to determine the level of residual acid, 3% wt. aqueous KOH was added resulting in a final concentration of 1000 ppm of KOH. The reaction mixture was heated to 100° C. and water was removed using a Dean Stark Trap (6.07 grams). To neutralize the remaining KOH, 6.8 ml of trimethylchlorosilane was added after the solution was cooled. A Rotovap® unit was used to strip off the toluene leaving a clear oil. $^{13}C$ and $^{29}Si$ NMR analysis indicated the composition to be: $M(cyclohexyldimethyl)_{0.43}$ $T(norbornyl)_{0.57}$. The viscosity was measured as 181,000,000 mPa·s (−40° C.), 49,000 mPa·s (0° C.), 1,210 mPa·s (40° C.), and 73 mPa·s (100° C.). The molecular weight as determined from a 0.5% wt THF solution run through a gel permeation column using polystyrene as a reference standard was 500 (Mn) and 670 (Mw) grams per mole. Traction coefficients were tested at various temperatures and the results are provided in Table 1.

Example E

Using the same process as Examples C and D, the following reactants were combined in a 2 liter, 3-neck glass flask. To 510 gram of water was added a solution of 80.5 grams of cyclohexyldimethylchlorosilane, 133.3 grams of cyclooctyltrichlorosilane and 313.0 grams of toluene to produce a silicone hydrolysate in toluene. The aqueous acid layer was removed and the product layer washed with water and aqueous NaHCO$_3$ until the pH was 6.5. The product solution was stripped on a Rotovap® unit to 42.2% silicone solids. A 3% wt aqueous KOH solution was added to a concentration of 1000 ppm KOH. The contents were heated to 100° C. and water was removed using a Dean Stark Trap (10.33 grams of water removed). To neutralize the remaining KOH after the bodying step, 9.6 ml of trimethylchlorosilane was added after the solution was cooled. A Rotovap® unit was used to strip off the toluene, leaving a thick, straw colored oil. $^{13}$C and $^{29}$Si NMR analysis indicated the composition to be: M(cyclohexyldimethyl)$_{0.47}$ T(cyclooctyl)$_{0.53}$. The viscosity was measured as 1,000,000 mPa·s (−40° C.), 6,000 mPa·s (0° C.), 393 mPa·s (40° C.), and 42 mPa·s (100° C.). The molecular weight as determined from a 0.5% wt THF solution run through a gel permeation column using polystyrene as a reference standard was 480 (Mn) and 620 (Mw) grams per mole. Traction coefficients were tested at various temperatures and the results are provided in Table 1.

Example F1

To a 1-L, 3-neck flask were charged 58.88 grams of tetraethylorthosilicate, 100 grams of cyclohexyldimethylchlorosilane and 140.1 grams of DME. Over a two minute period, 21.65 g of water was added resulting in an exotherm to 50° C. The reaction was continued for 1 hour at 50° C., then DME and by-product HCl was stripped out at 50° C. and 0.5 mm Hg. The stripped residues were re-dissolved into 140 grams of fresh DME and 9.29 grams of water also were added. Trimethylchlorosilane (55.31 grams) was added and the reactor contents heated for 1 hour at 50° C. Then the product solution was stripped on the Rotovap® stripper at 90° C. and 0.5 mm Hg for 2 hours. The product crude was re-dissolved in toluene and rinsed with alternating washes of saturated aqueous NaHCO$_3$ and water until the water wash was neutral pH. The toluene product phase was then dried over MgSO$_4$, filtered, and the toluene removed by a Rotovap® unit. A clear oil was recovered. $^{13}$C and $^{29}$Si MR analysis indicated the composition to be: M(cyclohexyldimethyl)$_{0.55}$ M(trimethyl)$_{0.12}$ Q$_{0.32}$. The viscosity was measured as 8,883 mPa·s (−40° C.), 329 mPa·s (0 C.), 58 mPa·s (40 C.), and 13 mPa·s (100 C). The molecular weight as determined from a 0.5% wt THF solution run through a gel permeation column using polystyrene as a reference standard was 760 (Mn) and 900 (Mw) grams per mole. Traction coefficients were tested at various temperatures and the results are provided in Table 1.

Example F2

The process as Example F1 was used. $^{13}$C and $^{29}$Si NMR analysis indicated the composition to be: M(cyclohexyldimethyl)$_{0.56}$ T(methyl)$_{0.11}$ Q$_{0.32}$. The viscosity of the fluid was 9,700 mPa·s (−40° C.), 425 mPa·s (0° C.), 75 mPa·s (40° C.), and 16 mPa·s (100° C.). Traction coefficients were tested at various temperatures and the results are provided in Table 1. See Table 2 for traction testing at different speeds and pressures.
Intermediate (I)

1800 grams of tetraethylorthosilicate (TEOS), 1160 grams of tetramethyldisiloxane, and 250 grams of ethanol were loaded into a 5 liter reactor flask. Then 542 grams of water and 793 grams concentrated HCl were added. The temperature rose to 33° C. and was mixed for 35 minutes. Then 500 ml of heptane was added, and the phases allowed to separate. The waste acid layer was separated, then the heptane product layer was washed with 500 ml water and with 500 ml of saturated NaHCO$_3$ solution. The heptane layer was dried over CaCl$_2$, then filtered to remove solids. The heptane was removed from the product by stripping on a Rotovap® unit at 80° C. and <10 mm Hg. 604.5 grams of Intermediate (I) were recovered. $^{13}$C and $^{29}$Si NMR indicated the composition to be: M(dimethylhydrogen)$_{1.99}$ Q. Residual ethoxy and silanol levels are 1.4% and 0.3% wt respectively. The molecular weight as determined from a 0.5% wt chloroform solution run through a gel permeation column using a silicone resin as a reference standard was 895 (Mn) and 1,693 (Mw) grams per mole. Traction coefficients were tested at various temperatures and the results are provided in Table 1.

Example G 299.95 grams (3.02 moles of SiH) of Intermediate (I) were mixed with 297.67 grams (3.62 moles) of cyclohexene and 50 ppm of a platinum catalyst complex. The reaction mixture was transferred to a Parr Reactor and run at 144° C., 32 psi for 20 hours. Conversion of SiH was determined to be about 90% by $^{29}$Si NMR. The Parr Reactor was then pressurized up to 100 psi with ethylene at 90–120° C. to quench remaining SiH. About 200 ml of hexane was added to facilitate filtering out the platinum solids, then the hexane was removed using a Rotovap® stripper at 100° C. and <2 mm Hg. 447.2 grams of product were recovered. $^{13}$C and $^{29}$Si NMR indicated the composition to be: M(cyclohexyldimethyl)$_{0.51}$ M(ethyl, dimethyl)$_{0.14}$ Q$_{0.35}$. Viscosity was measured as 664,000 mPa·s (−40° C.), 12,000 mPa·s (0° C.), 1,228 mPa·s (40° C.), and 172 mPa·s (100° C.). Traction coefficients were tested at various temperatures and the results are provided in Table 1.

Example H

In a 2 liter glass flask was loaded 284.2 grams (3.02 moles) of norbornene and 50 ppm of a platinum catalyst complex suitable for hydrosilation reactions. This was heated to 90° C. and then 250 grams (2.52 moles of SiH) of Intermediate (I) were added over one hour. Conversion of SiH was determined to be about 95% by $^{29}$Si NMR. The product intermediate was transferred to a Parr Reactor, pressurized up to 100 psi with ethylene at 110–120° C. for two hours to quench remaining SiH. About 500 grams of hexane was added to facilitate filtering out the platinum solids, then the hexane was removed using a Rotovap® unit at 100° C. and <2 mm Hg. 442.5 grams of product were recovered. $^{13}$C and $^{29}$Si NMR indicated the composition to be: M(norbornyldimethyl)$_{0.65}$ M(ethyl, dimethyl)$_{0.01}$ Q$_{0.34}$. Viscosity was measured as 15,000,000 mPa·s (−40° C.), 545,000 mPa·s 0° C.), 15,000 mPa·s (40° C.), and 844 mPa·s (100° C.). Traction coefficients were tested at various temperatures and the results are provided in Table 1.

Example I 300.0 grams (3.03 moles of SiH) of Intermediate (I) were mixed with 322.0 grams (3.42 moles) of norbornene and 50 ppm of a platinum catalyst complex in a 2 liter glass reactor. Conversion of SiH was determined to be >95% by $^{29}$Si NMR. The mixture was transferred to a Parr Reactor and then pressurized up to 100 psi with ethylene at 110° C. to quench remaining SiH. About 500 grams of hexane was added to facilitate filtering out the platinum solids, then the hexane was removed using a Rotovap® unit at 100° C. and <2 mm Hg. 501.2 grams of product were recovered. $^{13}$C and $^{29}$Si NMR indicated the composition to be: M(norbornyldimethyl)$_{0.62}$ M(ethyl, dimethyl)$_{0.01}$ Q$_{0.37}$. Viscosity was measured as 25,000,000 mPa·s (−40° C.), 696,000 mPa·s (0° C.), 18,900 mPa·s (40° C.), and 1,060 mPa·s (100° C.). Traction coefficients were tested at various temperatures and the results are provided in Table 1.

Example J 94.5 grams of norbornyldimethylchlorosilane was hydrolyzed using 49.0 grams of water. After one hour of reaction, the temperature of the reaction mixture had reached 56 C. 68.7 grams of heptane was then added to solubilize the product layer. After heating an additional 30 minutes at 70° C., the reaction was cooled and the product and waste acid layers allowed to separate. 60 grams of product layer was isolated from the aqueous waste HCl. Then the product phase was washed repeatedly with 10% wt aqueous $NaHCO_3$, and finally with fresh water until the water wash phase had a pH of >6.0. The product phase was then stripped in a 1 L glass flask using a condenser, nitrogen sweep, and vacuum system to 105° C. with 10–20 mm Hg of vacuum. 73.8 grams of amber oil was recovered. $^{13}C$ and $^{29}Si$ NMR indicated the composition to be: 98.6 mole % M(norbornyldimethylsiloxy)$_{2.0}$, with 7.9 mole % (9.1 ppm) and 90.7 mole % (8.4 ppm) of two different conformations. GC analysis was run neat on a DB-1 capillary GC column using flame ionization detection without standards. Two major signals eluted at 13.5 and 13.6 minutes giving uncorrected area % values of 85% and 13% respectively, suggesting different conformations of the same disiloxane. The viscosity was measured as 640 mPa·s (−40° C.); 35 mPa·s (0° C.); 4 mPa·s (40° C.), and 1.6 mPa·s (100° C.). Traction coefficients were tested at various temperatures and the results are provided in Table 1.

Example K 164.84 grams norbornene and 5.06 grams of a platinum complex suitable for hydrosilation reactions were loaded to a 1 L 3-neck reactor. Under a nitrogen purge, the norbornene was melted to 90° C. in the presence of the platinum. Then 80.80 grams MeH siloxane cyclics with a dP of 4–5 was slowly added in order to control the exothermic character of the hydrosilation reaction. Reaction temperature slowly increased to 120° C. After MeH cyclics addition was completed, an additional 6.0 grams of norbornene was added to insure an excess relative to SiH. Reaction was continued for an additional 2 hours at 120° C. Toluene was then added to reduce the viscosity so that Celite® filter aid could be used with a fritted funnel to remove the spent platinum salts. The toluene was then removed by Rotovap® at 150° C. for 1.5 hours at 5 mm Hg. The resulting fluid was amber and very viscous, but soluble in toluene as well as chloroform. $^{13}C$ and $^{29}Si$ NMR indicated the composition to be: D(norbornylmethyl)$_{0.98}$ D(methylhydrogen)$_{0.01}$ or 98.2 mole % norbornyl functionality on silicon. Example K's viscosity as a 65% solution in polyisobutylene was 130,000,000 mPa·s (−40° C.); 56,000 mPa·s (0° C.); 588 mPa·s (40° C.), 23 mPa·s (100° C.). Traction coefficients were tested at various temperatures and the results are provided in Table 1.

Example L1

101.8 grams of 2,4,4-trimethyl-pent-1-ene and 1.47 grams (50 ppm Pt metal) of a platinum metal complex suitable for hydrosilation reactions were mixed in a 1 liter, 3-neck flask. The reaction flask was heated to 90° C., and then 45.36 grams of MeH siloxane cyclics with a dP of 4–5 were added dropwise. The reaction mixture was heated slowly to 104° C. and held there for 2 hours. FTIR testing indicated that little, if any, SiH remained at this time. The product solution was pressure filtered through a 0.45 micron filter, then stripped using a Rotovap® to remove 16.67 g of volatiles. The yield was 119.73 g of an amber colored, transparent, low viscosity liquid. $^{13}C$ and $^{29}Si$ NMR indicated the composition to be: D(2,4,4-trimethylpentyl, methyl)$_{0.97}$ with 3% or less of residual 2,4,4-trimethyl-1-pentene. The viscosity was measured as 22,000 mPa·s (−40° C.), 380 mPa·s (0° C.), 50 mPa·s (40° C.), and 9 mPa·s (100° C.). Traction coefficients were tested at various temperatures and the results are provided in Table 1.

Example L2

The process of example L1 was repeated. $^{13}C$ and $^{29}Si$ NMR analysis indicated the composition to be: D(2,4,4-trimethylpentyl, methyl)$_{0.96}$ with <4% residual 2,4,4-trimethyl-1-pentene. The viscosity was 24,000 mPa·s (−40° C.), 392 mPa·s (0° C.), 51 mPa·s (40° C.), and 19 mPa·s (100° C.). Traction coefficients were tested at various temperatures and the results are provided in Table 1. See Table 2 for traction testing at different speeds and pressures.

Example M

Into a 2 liter Parr Reactor were loaded 625.6 grams of $(Me_3SiO_{1/2})_{0.15}$ $(Me_2SiO_{2/2})_{0.62}$ $(MeHSiO_{2/2})_{0.23}$ silicone fluid, 230 grams of cyclohexene and 8.63 grams of a platinum complex suitable for hydrosilation reactions (49 ppm of Pt metal). The contents of the reactor were heated to 90° C. and the system pressurized to 20 psi. After running for 20 hours, the reactor temperature had risen to 138° C. and the pressure to 25 psi. Analysis of the crude product by $^{13}C$ and $^{29}Si$ NMR indicated 97% SiH conversion. After stripping off the excess cyclohexene using a Rotovap® (about 70 grams of cyclohexene was removed), the crude was transferred back into in the Parr Reactor with ethylene to remove the last SiH. The Parr Reactor was pressurized to 80 psi at 27° C. and the temperature increased to 100° C. over a three hour period. $^{13}C$ and $^{29}Si$ NMR indicated that no residual SiH remained after treatment with ethylene. The product solution was then stripped a final time at 100 C., 2 mm Hg using the Rotovap® unit. 717.5 grams of product were isolated. $^{13}C$ and $^{29}Si$ NMR indicated the composition to be: M(trimethyl)$_{0.13}$ D(cyclohexylmethyl)$_{0.26}$ D(dimethyl)$_{0.61}$ with a corresponding molecular weight of 92.59 grams per mole. The molar percentage of cyclohexyl groups on silicon relative to all R groups on silicon is 12.21%. The viscosity was measured as 1,070 mPa·s (−40° C.); 113 mPa·s (0° C.); 32 mPa·s (40° C.), 10 mPa·s (100° C). Traction coefficients were tested at various temperatures and the results are provided in Table 1.

Example N

Into a 2 liter Parr Reactor, 5.08 grams (49.9 ppm Pt metal) of a hydrosilation platinum complex was mixed with 274 grams of $Me_3SiO_{1/2})_{0.17}$ $(Me_2SiO_{2/2})_{0.29}$ $(MeHSiO_{2/2})_{0.53}$. The system was then pressurized to <10 psi with 230 g of cyclohexene and the temperature slowly raised over 4 hours to 148° C. with the pressure rising as well to 30 psi. The reaction was left at this condition for an additional 18 hours. $^{13}C$ and $^{29}Si$ NMR indicated that about 8 mole % of the SiH remained unreacted. A Rotovap® unit was used to strip out the unreacted cyclohexene (70° C. and 10 m Hg) which yielded 482.1 g of an intermediate. The intermediate was then transferred back into in the Parr reactor and ethylene used to react the residual SiH at 140° C. for 18 hours (100 psi). The product was then stripped at 100° C. and 2 mm Hg yielding 341.7 g of a colored, clear liquid. The viscosity was measured as 67,000 mPa·s (−40° C.); 1,000 mPa·s (0° C.); 129 mPa·s (40° C.), 24 mPa·s (100° C.). Traction coefficients were tested at various temperatures and the results are provided in Table 1.

Example O

The procedure for this fluid is the same as Example M. The reaction mixture consisted of 300.1 grams of $(Me_3SiO_{1/2})_{0.14}$ $(Me_2SiO_{2/2})_{0.61}$ $(MeHSiO_{2/2})_{0.25}$ silicone fluid, 141.9 grams of 2,4,4-trimethylpent-1-ene and 4.41 grams of a platinum complex suitable for hydrosilation reactions (50 ppm of Pt metal). The silicone fluid was then added to alkene. The contents of the reactor were heated to 97° C. After running for 2 hours, the analysis of the crude product by $^{13}C$ and $^{29}Si$ NMR indicated 98% SiH conversion. 40 grams additional 2,4,4-trimethylpent-1-ene added and refluxed overnight at 120° C. After stripping off the excess 2,4,4-trimethylpent-1-ene using a Rotovap® unit at 100° C. for 2 hours at 4 mm Hg. A dark oil was recovered. $^{13}C$ and $^{29}Si$ NMR indicated that no residual SiH remained after treatment with ethylene. The product solution was then stripped a final time at 100° C., 2 mm Hg using the Rotovap® unit. $^{13}C$ and $^{29}Si$ NMR indicated the composition to be: $M(trimethyl)_{0.12}$ $D(2,4,4-trimethylpentyl, methyl)_{0.24}$ $(Me_2SiO_{2/2})_{0.62}$ $(MeEtSiO2_{/2})_{0.02}$ corresponding to a molecular weight of 97.88 grams per mole. GPC analysis using a polystyrene reference from a 0.5% THF solution indicated an (Mn) of 1870 and an (Mw) of 234,900 grams per mole. The molar percentage of 2,4,4-trimethylpentyl groups on silicon relative to all R groups on silicon is 11.32%. The viscosity was measured as 490 mPa·s (−40° C.), 73 mPa·s (0° C.), 24 mPa·s (40° C.), and 8 mPa·s (100° C.). Traction coefficients were tested at various temperatures and the results are provided in Table 1.

Example P

The same procedure as Example O was followed. The reaction mixture consisted of 300 grams of $(Me_3SiO_{1/2})_{0.15}$ $(Me_2SiO_{2/2})_{0.62}$ $(MeHSiO_{2/2})_{0.23}$ silicone fluid, 119.22 grams of norbornene and 4.21 grams of a platinum complex suitable for hydrosilation reactions (50 ppm of Pt metal). The silicone fluid was added to alkene dropwise over a 2.5 hour period, maintaining a reaction temperature at 97–109° C. during addition. Following addition, maintained at 120° C. for two hours. According to FTIR and $^{29}Si$ NMR analysis, conversion of Si—H on silicone copolymer to Si—R was 100%. The product solution was then stripped at 90° C. for 2 hours, 5 mm Hg, using the Rotovap® unit, to yield an amber oil. $^{13}C$ and $^{29}Si$ NMR indicated the composition to be: $M(trimethyl)_{0.13}$ $D(norbornyl, methyl)_{0.25}$ $D(dimethyl)_{0.62}$. GPC analysis using a polystyrene reference from a 0.5% THF solution indicated an (Mn) of 1,970 and an (Mw) of 307,000 grams per mole. The percentage of norbornyl groups on silicon relative to all R groups on silicon is 12.87% The viscosity was measured as 2,632 mPa·s (−40° C.), 197 mPa·s (0° C.), 49 mPa·s (40° C.), and 14 mPa·s (100° C.). Traction coefficients were tested at various temperatures and the results are provided in Table 1.

Example Q

The same procedure as Example P was used. The reaction mixture consisted of 100 grams of $(Me_3SiO_{1/2})_{0.17}$ $(Me_2SiO_{2/2})_{0.29}$ $(MeHSiO_{2/2})_{0.53}$ silicone fluid, 82.48 grams of norbornene and 3.75 grams of a platinum complex suitable for hydrosilation reactions (100 ppm of Pt metal). Addition time for alkene was about 1 hour. The mixture was then diluted with an equal volume of toluene, filtered through 0.45 micron-size filter, and the toluene stripped off at 140° C., 5 mm Hg, using the Rotovap® unit, to yield an amber, opaque oil. According to FTIR and $^{29}Si$ NMR analysis, conversion of Si—H on silicone copolymer to Si—R was 100%. $^{13}C$ and $^{29}Si$ NMR indicated the composition to be: $M(trimethyl)_{0.16}$ $D(norbornyl, methyl)_{0.54}$ $D(dimethyl)_{0.30}$ GPC analysis using a polystyrene reference from a 0.5% THF solution indicated an (Mn) of 1,010 and an (Mw) of 1,510 grams per mole. The percentage of norbornyl groups on silicon relative to all R groups on silicon was 25%. The viscosity was measured as 5,000,000 mPa·s (−40° C.), 8,000 mPa·s (0° C.), 478 mPa·s (40° C.), and 52 mPa·s (100° C.). Traction coefficients were tested at various temperatures and the results are provided in Table 1.

Example R 0.45 grams of a suitable hydrosilation platinum complex (1000 ppm platinum metal) were mixed with 278.9 grams (1.40 equivalents of vinyl) of 2,4,4-trimethylpent-1-ene and heated to 90° C. 10 grams of a $(Me_3SiO_{1/2})_{0.03}$ $(MeHSiO_{2/2})_{0.97}$ fluid were added immediately, after which the remaining 96.7 grams of the siloxane fluid were added dropwise. Total SiH equivalents added was 1.00 of SiH. The reaction was run at 130° C. for 30 hours. After cooling, the crude reaction mixture was transferred to a 2 liter Parr reactor and after purging with Nitrogen was pressurized with ethylene to react with unreacted SiH. The reaction was run another 30 hours at 130° C. to a final pressure of 650 psi. The product was stripped at 160° C. and 2 mm Hg. $^{13}C$ and $^{29}Si$ NMR indicated the composition to be: $M(trimethyl)_{0.03}$ $D(2,4,4-trimethylpentyl, methyl)_{0.96}$ $D(ethyl, methyl)_{0.01}$. The molar percentage of cyclohexyl groups on silicon relative to all R groups on silicon was 47.12%. The viscosity was measured as 41,000,000 mPa·s (−40° C.); 49,000 mPa·s (0° C.); 4,500 mPa·s (40° C.), 626 mPa·s (100° C.). Traction coefficients were tested at various temperatures and the results are provided in Table 1.

Example S

To a mixture of 264.75 g of a siloxane copolymer $(Me_3SiO_{1/2})_{0.14}$ $(Me_2SiO_{2/2})_{0.62}$ $(MeHSiO_{2/2})_{0.24}$ and 203.42 g of 5-ethylidene-2-norbornene was added with stirring 0.68 g of a 4.2% solution of a platinum hydrosilation catalyst complex in a dimethylsiloxane polymer mixed with 5 g of 5-ethylidene-2-norbornene. The mixture was placed in a 135° C. oil bath for 15 h. Analysis using IR indicated a 95% conversion of SiH functionality. The crude hydrosilylation product was transferred to a stainless steel pressure reactor and purged with helium. It was then placed under 26 psig ethylene pressure and heated to 130° C. for 2.5 hours. After cooling, IR analysis showed complete consumption of the SiH. After an extensive helium purge, 0.84 g of 5% palladium on activated carbon was added and the contents placed under approximately 610 psig of hydrogen pressure at 110° C. for 18 hours. After filtration and stripping to 170° C. at 5 mm Hg, NMR showed complete consumption of unsaturation. $^{13}C$ and $^{29}Si$ NMR indicated the composition to be: $M(trimethyl)_{0.13}$ $D(dimethyl)_{0.62}$ $D(2-bicyclo(2.2.1)$ heptylethyl, methyl$)_{0.25}$ $D(ethyl, methyl)_{0.01}$. GPC analysis using a polystyrene reference from a 0.5% THF solution indicated an (Mn) of 959 and an (Mw) of 1,876 grams per mole. The molar percentage of 5-ethylidenenorbonyl groups on silicon relative to all R groups on silicon is 11.62%. Note that four isomers for this addition product are possible and that the NMR data for all four isomers has been combined into one value. The viscosity was measured as 4,880 mPa·s (−40° C.), 240 mPa·s (0° C.), 52 mPa·s (40° C.), and 13 mPa·s (100° C.). Traction coefficients were tested at various temperatures and the results are provided in Table 1.

Example T

To a mixture of 49.0 g of a siloxane copolymer $(Me_3SiO_{1/2})_{0.17}$ $(Me_2SiO_{2/2})_{0.30}$ $(MeHSiO_{2/2})_{0.53}$ and 270.5 g of 5-ethylidene-2-norbornene was added with stirring 0.49 g of a 4.2% solution of a platinum hydrosilation catalyst complex in a dimethylsiloxane polymer mixed with 5 g of 5-ethylidene-2-norbornene. The mixture was slowly heated to 80° C. at which temperature it exothermed to 105° C. To this was added 196.2 g of additional 5-ethylidene-2-norbornene over 15 minutes. The reaction was then heated to 130° C. for 30 hours. Analysis using IR spectroscopy indicated an 83% conversion of SiH functionality. The crude hydrosilylation product was transferred to a stainless steel pressure reactor and purged with helium. It was then placed under 26 psig ethylene pressure and heated to 130° C. for 2.5 hours followed by 650 psig at 130° C. for 17 h. After cooling, IR analysis showed quantitative consumption of the SiH. Still using the stainless steel pressure reactor, 496 g of the above intermediate was mixed with 50 g of IPA and 4.0 g of 5% palladium of activated carbon. After purging with helium, the contents were reacted at a maximum of approximately 650 psig of hydrogen pressure at 110° C. for 17 hours to hydrogenate the norbornyl ring unsaturation. After filtration and stripping to 170° C. at 5 mm Hg, NMR showed that 82% of the unsaturation had been reduced. $^{13}C$ and $^{29}Si$ NMR indicated the composition to be: $M(trimethyl)_{0.17}$ $D(dimethyl)_{0.27}$ $D(2\text{-bicyclo}(2.2.1)heptylethyl, methyl)_{0.51}$ $D(ethyl, methyl)_{0.06}$. GPC analysis using a polystyrene reference from a 0.5% THF solution indicated an (Mn) of 752 and an (Mw) of 1,126 grams per mole. The molar percentage of 5-ethylidenenorbonyl groups on silicon relative to all R groups on silicon was 23.29%. Note that four isomers for this addition product are possible and that the NMR data for all four isomers has been combined into one value. The viscosity was measured as 805,000 mPa·s (−40° C.), 3,000 mPa·s (0° C.), 246 mPa·s (40° C.), and 32 mPa·s (100° C.). Traction coefficients were tested at various temperatures and the results are provided in Table 1.

Example U

Cohydrolysis and subsequent condensation of a chlorosilane mixture of n-octyltrichlorosilane, dimethyldichlorosilane and trimethylchlorosilane was carried out to yield a thick, liquid polymer. $^{13}C$ and $^{29}Si$ NMR indicated the composition to be: $M(trimethyl)_{0.05}$ $D(dimethyl)_{0.73}$ $T(n\text{-octyl})_{0.22}$. The viscosity was measured as 6,000 mPa·s (−40° C.), 87 mPa·s (0° C.), 13 mPa·s (40° C.), and 3 mPa·s (100° C.). Traction coefficients were tested at various temperatures and the results are provided in Table 1.

Example V

Example L1 was repeated using the same process, except that to a mixture of 65.32 grams of 2,4,4-trimethylpent-1-ene, 117.45 grams of norbornene, and 2.96 grams of a suitable platinum based hydrosilation catalyst at 94° C. were added 100.00 grams of MeH siloxane cyclics with a dP of 4–5. The addition time was two hours with a temperature from 94–105° C. The reaction was then heated an additional two hours at 108° C. At this point no detectable SiH was noted by FTIR. The product was then filtered using a 0.45 micron pressure filter and then stripped to remove unreacted volatile materials at 110° C. and 5 mm Hg. $^{13}C$ and $^{29}Si$ NMR analysis indicated the composition to be: $D(2,4,4\text{-trimethylpentyl, methyl})_{0.28}$ $D(norbornyl, methyl)_{0.70}$ $M(trimethyl)_{0.01}$. The viscosity of the fluid was 2,538,942 mPa·s (0° C.), 3,530 mPa·s (40° C.), and 71 mPa·s (100° C.). GPC analysis using a polystyrene reference from a 0.5% THF solution indicated an (Mn) of 540 and an (Mw) of 600 grams per mole.

Example W

A (dodecyl, methyl), (2-phenylpropyl, methyl) siloxane copolymer was produced from the hydrosilation of a MeH siloxane polymer with alphamethylstyrene and 1-dodecene using a suitable platinum based hydrosilation catalyst. Example W is composed of D(2-phenylpropyl, methyl) and D(docecyl, methyl) structural units wherein the D(2-phenylpropyl, methyl) is from 16–22 mole % of all D units. The viscosity as measured at 25° C. was 1,275 mPa·s.

Example X

Example L1 was repeated using the same process, except that to a mixture of 112.07 grams of 2,4,4-trimethylpent-1-ene, 78.32 grams of norbornene, and 2.96 grams of a suitable platinum based hydrosilation catalyst at 96° C. were added 100 grams of MeH siloxane cyclics with a dP of 4–5. During the addition, 0.55 grams extra of catalyst were added to speed up the hydrosilation rate. The reaction was then heated an additional two hours at 114° C. At this point no detectable SiH was noted by FTIR. The product was then filtered using a 0.45 micron pressure filter and then stripped to remove unreacted volatile materials at 100° C. and 5 mm Hg. $^{13}C$ and $^{29}Si$ NMR analysis indicated the composition to be: $D(2,4,4\text{-trimethylpentyl, methyl})_{0.51}$ $D(norbornyl, methyl)_{0.46}$ $T(methyl)_{0.01}$ $M(trimethyl)_{0.01}$. The viscosity of the fluid was measured as 105,000,000 mPa·s (−40° C.), 12,579 mPa·s (0° C.), 351 mPa·s (40° C.), and 26 mPa·s (100° C.). GPC analysis using a polystyrene reference from a 0.5% THF solution indicated an (Mn) of 630 and an (Mw) of 740 grams per mole.

Example Y

Example L1 was repeated using the same process, except that to a mixture of 167.99 grams of 2,4,4-trimethylpent-1-ene, 46.98 grams of norbornene, and 3.15 grams of a suitable platinum based hydrosilation catalyst at 96° C. were added 100 grams of MeH siloxane cyclics with a dP of 4–5. After two hours of addition at 96–102° C., it appeared that the addition reaction had stopped. Therefore an additional 0.63 grams of catalyst were added and the addition of the MeH siloxane cyclics was completed after 30 more minutes. The reaction was then heated an additional 30 minutes with an exotherm reaching 130° C. At this point no detectable SiH was noted by FTIR. The product was then filtered using a 0.45 micron pressure filter and then stripped to remove unreacted volatile materials at 110° C. and 5 mm Hg. $^{13}C$ and $^{29}Si$ NMR analysis indicated the composition to be: $D(2,4,4\text{-trimethylpentyl, methyl})_{0.70}$ $D(norbornyl, methyl)_{0.28}$ $M(trimethyl)_{0.01}$. The viscosity of the fluid was measured as 621,000 mPa·s (−40° C.), 1,625 mPa·s (0° C.), 113 mPa·s (40° C.), and 14 mPa·s (100° C.). GPC analysis using a polystyrene reference from a 0.5% THF solution indicated an (Mn) of 690 and an (Mw) of 750 grams per mole.

Example Z 226.2 grams of n-octene and 3.27 grams of a suitable platinum based hydrosilation catalyst were charged to a 1-liter glass reactor. This was heated to 95° C. and then 100.23 grams of MeH siloxane cyclics with a dP of 4–5 were slowly added. The addition took about 30 minutes during which time the temperature was maintained between 115–120° C. After the addition was completed the reaction was heated for an additional one and one-half hours at a temperature of 120° C. after which FTIR showed little, if any, SiH remaining. The product was then filtered using a 0.45 micron pressure filter and then stripped to remove unreacted volatile materials at 100° C. and 4 mm Hg. $^{13}$C and $^{29}$Si NMR analysis indicated the composition to be: D(n-octyl, methyl)$_{0.97}$ D(methyl, hydrogen)$_{0.02}$ M(trimethyl)$_{0.01}$. GPC analysis using a polystyrene reference from a 0.5% THF solution indicated an (Mn) of 1,014 and an (Mw) of 1,082 grams per mole.

Example AA

A chlorosilane mixture consisting of methyltrichlorosilane, dimethyldichlorosilane and trimethylchlorosilane was hydrolysed using an excess of water and toluene as a co-solvent. Optionally, isopropanol can be used as a second solvent in addition to toluene. After the initial hydrolysis, the aqueous acid layer is decanted and repeated washing done with additional water to reduce residual acid content of the toluene phase. Additional trimethylchlorosilane is added along with only enough water to facilitate its hydrolysis, and the resin intermediate was then bodied to reduce residual silanol and to build molecular weight. $^{13}$C and $^{29}$Si NMR analysis indicates the composition to be: M(trimethyl)$_{0.12}$ D(dimethyl)$_{0.50}$ T(methyl)$_{0.38}$. The viscosity was measured as 4,975 mPa·s (−40° C.), 280 mPa·s (0° C.), 63 mPa·s (40° C.), and 16 mPa·s (100° C.). The molecular weight as determined from a 0.5% wt THF solution run through a gel permeation column using polystyrene as a reference standard was 1,360 (Mn) and 3,362 (Mw) grams per mole.

Example AB

A (ethyl, methyl), (2-phenylpropyl, methyl) siloxane copolymer produced from the hydrosilation of a MeH siloxane polymer with ethylene and alphamethylstyrene using a suitable platinum based hydrosilation catalyst. Example AB is composed of D(2-phenylpropyl, methyl) and D(ethyl, methyl) structural units wherein the D(2-phenylpropyl, methyl) is from 15–21 mole % of all D units. The viscosity as measured at 25° C. was 1,300 mPa·s.

Example AC

The same procedure as Example Q was used. 199.99 grams of (Me$_3$SiO$_{1/2}$)$_{0.17}$ (Me$_2$SiO$_{2/2}$)$_{0.29}$ (MeHSiO$_{2/2}$)$_{0.53}$ silicone fluid was slowly dripped into a 1-liter glass reactor which contained 196.56 grams of 2,4,4-trimethylpent-1-ene and 7.68 grams of a platinum complex suitable for hydrosilation reactions (50 ppm of Pt metal). The reactors contents were brought to 89° C. before the addition was started. Addition time was about ¾ hour. During the addition, the reaction temperature was maintained between 86–94° C. After the addition was completed the reaction was heated for an additional two hours at a temperature of 105° C. after which FTIR showed little, if any, SiH remaining. The product was then filtered using a 0.45 micron pressure filter and then stripped to remove unreacted volatile materials at 105° C. and 4 mm Hg. $^{13}$C and $^{29}$Si NMR indicated the composition to be: M(trimethyl)$_{0.17}$ D(2,4,4-trimethylpentyl, methyl)$_{0.52}$ D(dimethyl)$_{0.29}$ D(methylhydrogen)$_{0.01}$ T(methyl)$_{0.01}$. GPC analysis using a polystyrene reference from a 0.5% THF solution indicated an (Mn) of 1,761 and an (Mw) of 2,866 grams per mole.

Comparison 1

(Comp. 1): a hydrogenated styrene dimer (2,4 dicyclohexyl-2-methylpentane) available under the trade name of Santotrac® 50 traction fluid (Findett Corporation, St. Louis, Mo.). The viscosity was measured as 407,000 mPa·s (−40° C.), 385 mPa·s (0° C.), 22 mPa·s (40° C.), and 4 mPa·s (100° C.). Traction coefficients were tested at various temperatures and the results are provided in Table 1.

Comparison 2

(A) (Comp. 2A): a bicyclo (2.2.1) heptane methylene dimer (bis-methyl substituted norbornyl methane) available as Nissan KTF-1 Extroid® CVT fluid. The viscosity was measured as 216,000 mPa·s (−40° C.), 354 mPa·s (0° C.), 29 mPa·s (40° C.), and 4 mPa·s (100° C.). (B) (Comp. 2B): a different lot of the above material having a viscosity of 156,000 mPa·s (−40° C.), 365 mPa·s (0° C.), 30 mPa·s (40° C.), and 4.5 mPa·s (100° C.). Traction coefficients were tested at various temperatures for Comp 2A and the results are provided in Table 1. See Table 2 for traction testing of Comp 2B at different speeds and pressures.

TABLE 1

Traction Coefficients and Viscosity of Various Siloxane Compositions

| Example | Compositional Units | 0° C. Traction Coefficient | 40° C. Traction Coefficient | 100° C. Traction Coefficient | Viscosity mPa.s 40° C. |
|---|---|---|---|---|---|
| A1 | MT | 0.108 | 0.094 | 0.061 | 15 |
| A2 | MT | 0.111 | 0.100 | 0.067 | 20 |
| B | MT | 0.102 | 0.092 | 0.065 | 21 |
| C | MT | fluid starved** | 0.090 | 0.094 | 858 |
| D | MT | fluid starved** | 0.089 | 0.097 | 1,210 |
| E | MT | fluid starved** | 0.098 | 0.078 | 393 |
| F1 | MQ | 0.103 | 0.096 | 0.061 | 58 |
| F2 | MQ | 0.103 | 0.098 | 0.065 | 75 |
| G | MQ | fluid starved** | 0.099 | 0.067 | 1,228 |
| H | MQ | fluid starved** | 0.096 | 0.083 | 15,000 |
| I | MQ | fluid starved** | 0.097 | 0.084 | 18,900 |
| J | MM | 0.100 | 0.085 | 0.054 | 4 |
| K | D | fluid starved** | 0.088 | 0.088 | 588 |
| L1 | D | 0.097 | 0.095 | 0.068 | 50 |

TABLE 1-continued

Traction Coefficients and Viscosity of Various Siloxane Compositions

| Example | Compositional Units | 0° C. Traction Coefficient | 40° C. Traction Coefficient | 100° C. Traction Coefficient | Viscosity mPa.s 40° C. |
|---|---|---|---|---|---|
| L2 | D | 0.097 | 0.096 | 0.070 | 51 |
| M | MDM | 0.103 | 0.089 | 0.052 | 32 |
| N | MDM | 0.095 | 0.103 | 0.075 | 129 |
| O | MDM | 0.095 | 0.077 | 0.044 | 24 |
| P | MDM | 0.100 | 0.089 | 0.058 | 49 |
| Q | MDM | fluid starved** | 0.084 | 0.073 | 478 |
| R | MDM | fluid starved** | 0.058 | 0.066 | 4,500 |
| S | MDM | 0.096 | 0.089 | 0.058 | 52 |
| T | MDM | fluid starved** | 0.089 | 0.076 | 249 |
| U | MDT | *** | 0.061 | 0.026 | 13 |
| Comp 1* | | 0.108 | 0.113 | 0.085 | 22 |
| Comp 2A* | | 0.105 | 0.108 | 0.083 | 29 |

*Comparative
**Sample not tested due to high viscosity
***traction coefficient not measured

TABLE 2

Traction Coefficients and Viscosity at Various Speeds and Pressure

| Example | Compositional Units | −40° C. Traction Coefficient | −20° C. Traction Coefficient | 0° C. Traction Coefficient | Test Speed meters/sec | Pressure GPa | Viscosity mPa.s (−40° C.) |
|---|---|---|---|---|---|---|---|
| A2 | MT | 0.1150 | 0.1200 | 0.1170 | 2 | 1.5 | 2,620 |
| F2 | MQ | 0.0880 | 0.1090 | 0.1170 | 2 | 1.5 | 9,700 |
| L2 | D | 0.0650 | 0.1010 | 0.1100 | 2 | 1.5 | 24,000 |
| Comp2B* | | fluid starved** | 0.0800 | 0.1160 | 2 | 1.5 | 156,000 |
| A2 | MT | 0.0610 | 0.0850 | 0.1050 | 10 | 1.5 | |
| F2 | MQ | 0.0310 | 0.0680 | 0.0840 | 10 | 1.5 | |
| L2 | D | fluid starved** | 0.0580 | 0.0830 | 10 | 1.5 | |
| Comp2B* | | fluid starved** | 0.0530 | 0.0870 | 10 | 1.5 | |
| A2 | MT | 0.1170 | 0.1180 | 0.1160 | 2 | 4.0 | |
| F2 | MQ | 0.1160 | 0.1200 | 0.1200 | 2 | 4.0 | |
| L2 | D | 0.0910 | 0.1080 | 0.1080 | 2 | 4.0 | |
| Comp2B* | | fluid starved** | 0.1030 | 0.1060 | 2 | 4.0 | |
| A2 | MT | 0.1000 | 0.1060 | 0.1100 | 10 | 4.0 | |
| F2 | MQ | fluid starved** | 0.1030 | 0.1070 | 10 | 4.0 | |
| L2 | D | 0.0900 | 0.0980 | 0.1000 | 10 | 4.0 | |
| Comp2B* | | fluid starved** | 0.0920 | 0.0980 | 10 | 4.0 | |

*Comparative
**Sample not tested due to high viscosity.

Anti-wear testing was performed on the examples described in Table 3 below:

TABLE 3

Anti-Wear Test Results and Corresponding Traction Coefficients

| Example | Compositional Units | 4 Ball Wear 40 Kg | Traction Coefficient at 0° C. | Traction Coefficient at 100° C. |
|---|---|---|---|---|
| V | D | 0.384 | fluid starved** | 0.0839 |
| Y | D | 0.545 | 0.0785 | 0.0761 |
| X | D | 0.586 | fluid starved** | 0.0815 |
| L1 | D | 0.671 | 0.0973 | 0.0680 |
| Z | D | 0.683 | 0.0411 | 0.0100 |
| W | MDM | 0.466 | fluid starved** | 0.0053 |
| R | MDM | 0.519 | fluid starved** | 0.0664 |
| AA* | MDT | 1.446 | 0.0992 | 0.0738 |
| AB* | MDM | 2.786 | 0.0441 | 0.0122 |
| Q* | MDM | 3.313 | fluid starved** | 0.0725 |
| AC* | MDM | 3.031 | 0.0950 | 0.0500 |
| F1* | MQ | 3.433 | 0.1029 | 0.0609 |
| B* | MT | 3.475 | 0.1020 | 0.0648 |
| Comp2B* | | 0.973 | 0.1097 | 0.0761 |

*outside anti-wear claims
**Sample not tested due to high viscosity

We claim:

1. A method for transmitting torque in a traction drive system having at least two relatively rotatable members in a torque transmitting relationship comprising disposing on the tractive surfaces of the members a traction fluid comprising at least one siloxane composition chosen from
   (I) 33 to 80 mole percent units of formula ($R_3SiO_{1/2}$), 0.2 to 66.8 mole percent units of formula ($RSiO_{3/2}$), and 66.8 to 0.2 mole percent units of formula ($SiO_{4/2}$) having a viscosity of from 1.0 to 50,000 mPa·s at 40°

C., where each R is independently selected from alkyl groups comprising 1 to 18 carbon atoms and aryl groups comprising 6 to 18 carbon atoms provided from 10 to 70 mole percent of R groups are not methyl;

(II) 33 to 75 mole percent units of formula $(R_3SiO_{1/2})$ and 67 to 25 mole percent units of formula $(RSiO_{3/2})$ having a viscosity of from 2.0 to 20,000 mPa·s at 40° C., where each R is independently selected from alkyl groups comprising 1 to 18 carbon atoms and aryl groups comprising 6 to 18 carbon atoms provided from 10 to 70 mole percent of R groups are not methyl;

(III) 33 to 80 mole percent units of formula $(R_3SiO_{1/2})$ and 67 to 20 mole percent units of formula $(SiO_{4/2})$ having a viscosity of from 1.0 to 70,000 mPa·s at 40° C., where each R is independently selected from alkyl groups comprising 1 to 18 carbon atoms and aryl groups comprising 6 to 18 carbon atoms provided from 10 to 70 mole percent of R groups are not methyl;

(IV) 0 to 28 mole percent units of formula $(R_3SiO_{1/2})$, 37 to 93 mole percent units of formula $(R_2SiO_{2/2})$, and 6 to 56 mole percent units of formula $(RSiO_{3/2})$ having a viscosity of from 5.0 to 10,000 mPa·s at 40° C., where each R is independently selected from alkyl groups comprising 1 to 18 carbon atoms and aryl groups comprising 6 to 18 carbon atoms provided from 10 to 70 mole percent of R groups are not methyl and provided further that at least one of the R groups which is not methyl is chosen from alkyl groups comprising 7 to 18 carbon atoms and aryl groups comprising 7 to 18 carbon atoms;

(V) 1 to 100 mole percent units of formula $(R_3SiO_{1/2})$ and 99 to 0 mole percent units of formula $(R_2SiO_{2/2})$ having a viscosity of from 1.0 to 50,000 mPa·s at 40° C., where each R is independently selected from alkyl groups comprising 1 to 18 carbon atoms and aryl groups comprising 6 to 18 carbon atoms provided from 10 to 70 mole percent of R groups are not methyl and provided further that at least one of the R groups which is not methyl is chosen from alkyl groups comprising 7 to 18 carbon atoms and aryl groups comprising 7 to 18 carbon atoms; and (VI) cyclosiloxanes of formula $(R_2SiO_{2/2})_a$ having a viscosity of from 2.0 to 50,000 mPa·s at 40° C., where a is an integer ranging from 3 to 20, each R is independently selected from alkyl groups comprising 1 to 18 carbon atoms and aryl groups comprising 6 to 18 carbon atoms provided from 10 to 70 mole percent of R groups are not methyl.

2. The method of claim 1 where the traction fluid comprises at least one siloxane composition chosen from siloxane compositions (II), (III), (IV), (V), and (VI).

3. The method of claim 1 where the traction fluid comprises at least one siloxane composition chosen from siloxane compositions (II), (III), and (VI).

4. The method of claim 1 where siloxane composition (II) contains 33 to 67 mole percent $(R_3SiO_{1/2})$ units and 67 to 33 mole percent $(RSiO_{3/2})$ units having a viscosity of from 5.0 to 20,000 mPa·s at 40° C. provided from 15 to 60 mole percent of R groups are not methyl.

5. The method of claim 1 where siloxane composition (III) contains 50 to 75 mole percent $(R_3SiO_{1/2})$ units and 50 to 25 mole percent $(SiO_{4/2})$ units having a viscosity of from 5.0 to 50,000 mPa·s at 40° C. provided from 10 to 67 mole percent of R groups are not methyl.

6. The method of claim 1 where siloxane composition (IV) contains 0.1 to 10 mole percent $(R_3SiO_{1/2})$ units, 40 to 55 mole percent $(R_2SiO_{2/2})$ units and 40 to 55 mole percent $(RSiO_{3/2})$ units having a viscosity of from 200 to 5,000 mPa·s at 40° C. provided from 10 to 50 mole percent of R groups are not methyl and provided further that at least one of the R groups which is not methyl is chosen from alkyl groups comprising 7 to 18 carbon atoms.

7. The method of claim 1 where siloxane composition (V) contains 2.0 to 100 mole percent $(R_3SiO_{1/2})$ units and 98 to 0 mole percent $(R_2SiO_{2/2})$ units having a viscosity of from to 30,000 mPa·s at 40° C. provided from 10 to 60 mole percent of R groups are not methyl and provided further that at least one of the R groups which is not methyl is chosen from alkyl groups comprising 7 to 18 carbon atoms.

8. The method of claim 1 where siloxane composition (VI) contains $(R_2SiO_{2/2})_a$ units having a viscosity of from 5.0 to 50,000 mPa·s at 40° C., where a is an integer ranging from 4 to 10 provided from 10 to 50 mole percent of R groups are not methyl.

9. The method of claim 2 where siloxane composition (II) contains 33 to 67 mole percent $(R_3SiO_{1/2})$ units and 67 to 33 mole percent $(RSiO_{3/2})$ units having a viscosity of from 5.0 to 20,000 mPa·s at 40° C., where each R is independently selected from linear alkyl groups comprising 1 to 8 carbon atoms, branched alkyl groups comprising 4 to 18 carbon atoms, and cyclic alkyl groups comprising 5 to 18 carbon atoms and provided from 15 to 60 mole percent of R groups are not methyl.

10. The method of claim 2 where siloxane composition (III) contains 50 to 75 mole percent $(R_3SiO_{1/2})$ units and 50 to 25 mole percent $(SiO_{4/2})$ units having a viscosity of from 5.0 to 50,000 mPa·s at 40° C., where each R is independently selected from linear alkyl groups comprising 1 to 8 carbon atoms, branched alkyl groups comprising 4 to 18 carbon atoms, and cyclic alkyl groups comprising 5 to 18 carbon atoms and provided from 10 to 67 mole percent of R groups are not methyl.

11. The method of claim 2 where siloxane composition (IV) contains 0.1 to 10 mole percent $(R_3SiO_{1/2})$ units, 40 to 55 mole percent $(R_2SiO_{2/2})$ units and 40 to 55 mole percent $(RSiO_{3/2})$ units having a viscosity of from 200 to 5,000 mPa·s at 40° C., where each R is independently selected from linear alkyl groups comprising 1 to 8 carbon atoms, branched alkyl groups comprising 4 to 18 carbon atoms, and cyclic alkyl groups comprising 5 to 18 carbon atoms provided from 10 to 50 mole percent of R groups are not methyl and provided from 10 to 50 mole percent of R groups are not methyl and provided further that at least one of the R groups which is not methyl is chosen from alkyl groups comprising 7 to 18 carbon atoms.

12. The method of claim 2 where siloxane composition (V) contains 2.0 to 100 mole percent $(R_3SiO_{1/2})$ units and 98 to 0 mole percent $(R_2SiO_{2/2})$ units having a viscosity of from 2.0 to 30,000 mPa·s at 40° C., where each R is independently selected from linear alkyl groups comprising 1 to 8 carbon atoms, branched alkyl groups comprising 4 to 18 carbon atoms, and cyclic alkyl groups comprising 5 to 18 carbon atoms and provided from 10 to 60 mole percent of R groups are not methyl and provided further that at least one of the R groups which is not methyl is chosen from alkyl groups comprising 7 to 18 carbon atoms.

13. The method of claim 2 where siloxane composition (VI) contains $(R_2SiO_{2/2})_a$ units having a viscosity of from 5.0 to 50,000 mPa·s at 40° C., where a is an integer ranging from 4 to 10, each R is independently selected from linear alkyl groups having from 1 to 8 carbon atoms, branched alkyl groups having from 4 to 18 carbon atoms, and cyclic alkyl groups having from 5 to 18 carbon atoms provided from 10 to 50 mole percent of R groups are not methyl.

14. The method of claim 3 where siloxane composition (II) contains 33 to 67 mole percent ($R_3SiO_{1/2}$) units and 67 to 33 mole percent ($RSiO_{3/2}$) units having a viscosity of from 5.0 to 20,000 mPa·s at 40° C., where each R is independently selected from linear alkyl groups comprising 1 to 8 carbon atoms, branched alkyl groups comprising 4 to 18 carbon atoms, and cyclic alkyl groups comprising 5 to 18 carbon atoms provided from 15 to 60 mole percent of R groups are not methyl.

15. The method of claim 3 where siloxane composition (III) contains 50 to 75 mole percent ($R_3SiO_{1/2}$) units and 50 to 25 mole percent ($SiO_{4/2}$) units having a viscosity of from 5.0 to 50,000 mPa·s at 40° C., where each R is independently selected from linear alkyl groups comprising 1 to 8 carbon atoms, branched alkyl groups comprising 4 to 18 carbon atoms, and cyclic alkyl groups comprising 5 to 18 carbon atoms provided from 10 to 67 mole percent of R groups are not methyl.

16. The method of claim 3 where siloxane composition (VI) contains $(R_2SiO_{2/2})_a$ units having a viscosity of from 5.0 to 50,000 mPa·s at 40° C., where a is an integer ranging from 4 to 10, where each R is independently selected from linear alkyl groups comprising 1 to 8 carbon atoms, branched alkyl groups comprising 4 to 18 carbon atoms, and cyclic alkyl groups comprising 5 to 18 carbon atoms provided from 10 to 50 mole percent of R groups are not methyl.

17. The method of claim 3 where siloxane composition (II) contains 50 to 67 mole percent ($R_3SiO_{1/2}$) units and 50 to 33 mole percent ($RSiO_{3/2}$) units having a viscosity of from 5.0 to 5,000 mPa·s at 40° C., where each R is independently selected from methyl, cyclohexyl, 2,4,4-trimethylpentyl, and norbornyl provided from 18 to 57 mole percent of R groups are not methyl.

18. The method of claim 3 where siloxane composition (III) contains 67.0 to 71.4 mole percent ($R_3SiO_{1/2}$) units and 33.0 to 28.6 mole percent ($SiO_{4/2}$) units having a viscosity of from 10.0 to 5,000 mPa·s at 40° C., where each R is independently selected from methyl, cyclohexyl, 2,4,4-trimethylpentyl, and norbornyl provided from 24 to 67 mole percent of R groups are not methyl.

19. The method of claim 3 where siloxane composition (VI) contains $(R_2SiO_{2/2})_a$ units having a viscosity of from 5.0 to 50,000 mPa·s at 40° C., where a is an integer ranging from 4 to 10 and each R is independently selected from methyl, cyclohexyl, 2,4,4-trimethylpentyl, and norbornyl provided from 10 to 50 mole percent of R groups are not methyl.

20. A traction drive system having at least two relatively rotatable members in a torque transmitting relationship and a traction fluid disposed on the tractive surfaces of the members, the traction fluid comprising at least one siloxane composition chosen from (I) 33 to 80 mole percent units of formula ($R_3SiO_{1/2}$), 0.2 to 66.8 mole percent units of formula ($RSiO_{3/2}$), and 66.8 to 0.2 mole percent units of formula ($SiO_{4/2}$) having a viscosity of from 1.0 to 50,000 mPa·s at 40° C., where each R is independently selected from alkyl groups comprising 1 to 18 carbon atoms and aryl groups comprising 6 to 18 carbon atoms provided from 10 to 70 mole percent of R groups are not methyl;

(II) 33 to 75 mole percent units of formula ($R_3SiO_{1/2}$) and 67 to 25 mole percent units of formula ($RSiO_{3/2}$) having a viscosity of from 2.0 to 20,000 mPa·s at 40° C., where each R is independently selected from alkyl groups comprising 1 to 18 carbon atoms and aryl groups comprising 6 to 18 carbon atoms provided from 10 to 70 mole percent of R groups are not methyl;

(III) 33 to 80 mole percent units of formula ($R_3SiO_{1/2}$) and 67 to 20 mole percent units of formula ($SiO_{4/2}$) having a viscosity of from 1.0 to 70,000 mPa·s at 40° C., where each R is independently selected from alkyl groups comprising 1 to 18 carbon atoms and aryl groups comprising 6 to 18 carbon atoms provided from 10 to 70 mole percent of R groups are not methyl;

(IV) 0 to 28 mole percent units of formula ($R_3SiO_{1/2}$), 37 to 93 mole percent units of formula ($R_2SiO_{2/2}$), and 6 to 56 mole percent units of formula ($RSiO_{3/2}$) having a viscosity of from 5.0 to 10,000 mPa·s at 40° C. , where each R is independently selected from alkyl groups comprising 1 to 18 carbon atoms and aryl groups comprising 6 to 18 carbon atoms provided from 10 to 70 mole percent of R groups are not methyl and provided further that at least one of the R groups which is not methyl is chosen from alkyl groups comprising 7 to 18 carbon atoms and aryl groups comprising 7 to 18 carbon atoms;

(V) 1 to 100 mole percent units of formula ($R_3SiO_{1/2}$) and 99 to 0 mole percent units of formula ($R_2SiO_{2/2}$) having a viscosity of from 1.0 to 50,000 mPa·s at 40° C., where each R is independently selected from alkyl groups comprising 1 to 18 carbon atoms and aryl groups comprising 6 to 18 carbon atoms provided from 10 to 70 mole percent of R groups are not methyl and provided further that at least one of the R groups which is not methyl is chosen from alkyl groups comprising 7 to 18 carbon atoms and aryl groups comprising 7 to 18 carbon atoms; and (VI) cyclosiloxanes of formula $(R_2SiO_{2/2})_a$ having a viscosity of from 2.0 to 50,000 mPa·s at 40° C., where a is an integer ranging from 3 to 20, each R is independently selected from alkyl groups comprising 1 to 18 carbon atoms and aryl groups comprising 6 to 18 carbon atoms provided from 10 to 70 mole percent of R groups are not methyl.

21. A method of reducing wear in a traction drive system having at least two relatively rotatable members in a torque transmitting relationship comprising disposing on the tractive surfaces of the members a traction fluid comprising at least one siloxane composition chosen from (IVa) 0 to 28 mole percent units of formula ($R_3SiO_{1/2}$), 37 to 93 mole percent units of formula ($RCH_3SiO_{2/2}$), and 6 to 56 mole percent units of formula ($RSiO_{3/2}$) having a viscosity of from 5.0 to 10,000 mPa·s at 40° C., where each R is independently selected from alkyl groups comprising 1 to 18 carbon atoms and aryl groups comprising 6 to 18 carbon atoms provided (a) at least 65 mole percent of the R groups on ($RCH_3SiO_{2/2}$) are independently selected from alkyl groups comprising 5 to 18 carbon atoms, (b) no more than 35 mole percent of the R groups on ($RCH_3SiO_{2/2}$) are independently selected from aryl groups comprising 6 to 18 carbon atoms, and (c) at least one of all R groups which is not methyl is chosen from alkyl groups comprising 7 to 18 carbon atoms and aryl groups comprising 7 to 18 carbon atoms;

(Va) 4 to 33 mole percent units of formula ($R_3SiO_{1/2}$) and 96 to 67 mole percent units of formula ($RCH_3SiO_{2/2}$) having a viscosity of from 1.0 to 50,000 mPa·s at 40° C., where each R is independently selected from alkyl groups comprising 1 to 18 carbon atoms and aryl groups comprising 6 to 18 carbon atoms provided (a) at least 65 mole percent of the R groups on ($RCH_3SiO_{2/2}$) are independently selected from alkyl groups comprising 5 to 18 carbon atoms, (b) no more than 35 mole percent of the R groups on $(RCH_3SiO_{2/2})$ are independently selected from aryl groups comprising 6 to 18 carbon atoms, and (c) at least one of all R groups which is not methyl is chosen from alkyl groups comprising 7 to 18 carbon atoms and aryl groups comprising 7 to 18 carbon atoms; and (VIa) cyclosiloxanes of formula $(RCH_3SiO_{2/2})_a$ having a viscosity of from 2.0 to 50,000 mPa·s at 40° C., where a is an integer ranging from 3 to 20, each R is independently selected from alkyl groups comprising 1 to 18 carbon atoms and aryl groups comprising 6 to 18 carbon atoms provided (a) at least 80 mole percent of the R groups on $(RCH_3SiO_{2/2})$ are independently selected from alkyl groups comprising 5 to 18 carbon atoms, and (b) no more than 20 mole percent of the R groups on $(RCH_3SiO_{2/2})$ are independently selected from aryl groups comprising 6 to 18 carbon atoms.

22. The method of claim 21 where the traction fluid comprises at least one siloxane composition chosen from (Va), and (VIa).

23. The method of claim 21 where the traction fluid comprises siloxane composition (VIa) where (a) at least 80 mole percent of the R groups on $(RCH_3SiO_{2/2})$ are independently selected from branched alkyl groups comprising 5 to 18 carbon atoms, and cyclic alkyl groups comprising 5 to 18 carbon atoms provided no more than 30 mole percent of the R groups on $(RCH_3SiO_{2/2})$ are cyclic alkyl groups.

* * * * *